United States Patent
Zhou

(10) Patent No.: US 11,937,296 B2
(45) Date of Patent: Mar. 19, 2024

(54) MONITORING METHOD AND APPARATUS, DEVICE, AND STORAGE MEDIUM

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 532 days.

(21) Appl. No.: 17/266,579

(22) PCT Filed: Aug. 10, 2018

(86) PCT No.: PCT/CN2018/100013
§ 371 (c)(1),
(2) Date: Feb. 6, 2021

(87) PCT Pub. No.: WO2020/029262
PCT Pub. Date: Feb. 13, 2020

(65) Prior Publication Data
US 2021/0298077 A1    Sep. 23, 2021

(51) Int. Cl.
*H04W 72/12* (2023.01)
*H04L 5/00* (2006.01)
*H04W 16/14* (2009.01)

(52) U.S. Cl.
CPC ......... *H04W 74/0808* (2013.01); *H04L 5/001* (2013.01); *H04W 16/14* (2013.01)

(58) Field of Classification Search
CPC ...... H04L 5/001; H04L 5/0098; H04W 16/14; H04W 52/0219; H04W 74/0808
See application file for complete search history.

(56) References Cited

U.S. PATENT DOCUMENTS

2018/0242359 A1* 8/2018 Takano ............. H04W 72/0453
2018/0376494 A1* 12/2018 Hu ........................ H04W 16/14

FOREIGN PATENT DOCUMENTS

CN    105163388 A    12/2015
CN    105578474 A    5/2016
(Continued)

OTHER PUBLICATIONS

Extended European Search Report (EESR) in Application No. EP 18929616.3 dated Jul. 1, 2021.
(Continued)

*Primary Examiner* — Phuc H Tran
(74) *Attorney, Agent, or Firm* — Syncoda LLC; Feng Ma

(57) ABSTRACT

The present disclosure provides a listening method, a listening device, user equipment and a storage medium, which belong to the technical field of wireless communication. The method includes: listening in to a first frequency band group including p first frequency bands, p is a positive integer; in response to determining that the p first frequency bands are all occupied, listening in to the second frequency band group including q second frequency bands, q is a positive integer; where the first frequency bands and the second frequency bands are on an unlicensed frequency spectrum, and the listening priority of the first frequency band is higher than that of the second frequency band. The listening method provided by the embodiment of the present disclosure can reduce the energy consumed by the UE while listening in to the frequency bands on the unlicensed spectrum.

18 Claims, 6 Drawing Sheets

(56) References Cited

FOREIGN PATENT DOCUMENTS

| CN | 105898770 | A  | 8/2016  |
|----|-----------|----|---------|
| CN | 106447260 | A  | 2/2017  |
| CN | 106559797 | A  | 4/2017  |
| CN | 107027127 | A  | 8/2017  |
| CN | 107612643 | A  | 1/2018  |
| EP | 3335511   | A1 | 6/2018  |
| EP | 3413610   | A1 | 12/2018 |
| WO | 2016119475| A1 | 8/2016  |
| WO | 2016185275| A1 | 11/2016 |
| WO | 2017030603| A1 | 2/2017  |
| WO | 2017133612| A1 | 8/2017  |

OTHER PUBLICATIONS

Vivo, "Potential solutions and techniques for NR unlicensed spectrum R1-1801557" 3GPP TSR Ran WG1 Meeting #92 Athens, Greece, Feb. 26-Mar. 2, 2018.
India 1st Office Action in Application No. 202127009112, dated Jun. 2, 2022.
CN First Office Action in Application No. 201880001002.9, dated Jul. 22, 2020.
International search report in Application No. PCT/CN2018/100013, dated Apr. 28, 2019.

\* cited by examiner

MONITORING METHOD AND APPARATUS, DEVICE, AND STORAGE MEDIUM

CROSS-REFERENCE TO RELATED APPLICATIONS

This application is a U.S. national stage of International Application No. PCT/CN2018/100013 filed on Aug. 10, 2018, the disclosure of which is hereby incorporated by reference in its entirety.

TECHNICAL FIELD

The present disclosure relates to wireless communication technologies, in particular to a listening method, a listening device, equipment and a storage medium.

BACKGROUND

With the development of wireless communication technology, more and more communication systems can operate on unlicensed spectrums. Since multiple communication systems operate on the unlicensed spectrum, communication on the unlicensed spectrum generally adopts a listen before talk (LBT) mechanism to ensure the fairness of multiple communication systems. That is, a device needs to listen in to a frequency band on the unlicensed frequency spectrum before transmitting communication data, and can occupy the frequency band to transmit communication data when it is determined that the frequency band is idle.

In the related art, user equipment (UE) operating on the unlicensed spectrum needs to listen in to multiple frequency bands on the unlicensed frequency spectrum simultaneously. When it is determined that a certain frequency band is not occupied, the UE may occupy that frequency band to transmit communication data. However, more power will be consumed due to listening in to multiple frequency bands simultaneously by the UE.

SUMMARY

Embodiments of the present disclosure provide a listening method, a listening device, equipment, and a storage medium.

A first aspect of the embodiments of the present disclosure provides a listening method, including:

listening in to a first frequency band group, where the first frequency band group includes p first frequency bands, and p is a positive integer;

listening in to a second frequency band group in response to determining that the p first frequency bands are all occupied, the second frequency group includes q second frequency bands, and q is a positive integer;

the first frequency band and the second frequency band are on an unlicensed frequency spectrum, and a listening priority of the first frequency bands is higher than a listening priority of the second frequency bands.

Optionally, the first frequency bands and the second frequency bands are on different component carriers (CC); or, the first frequency bands and the second frequency bands are located on different bandwidth parts.

Optionally, the method further includes: receiving a listening frequency band set sent from a base station, the listening frequency band set includes at least two frequency bands on an unlicensed spectrum required to be listened by the UE, and the listening frequency band set includes the p first frequency bands and the q second frequency bands;

the listening in to the first frequency band group includes: after receiving the listening frequency band set sent by the base station, acquiring the p first frequency bands from the listening frequency band set to form the first frequency band group; and listening in to the first frequency band group.

Optionally, the listening frequency band set is sent to the UE from the base station after the UE accesses and operates on the unlicensed spectrum.

Optionally, the method further includes: acquiring priority information, where the priority information is used for indicating the listening priorities of the frequency bands included in the listening frequency band set;

the listening in to the second frequency band group in response to determining that the p first frequency bands are all occupied includes: when it is determined that all of the p first frequency bands are occupied, acquiring, based on the priority information, the q second frequency band from the listening frequency band set to form the second frequency band group, where the priority of the second frequency bands is lower than that of the first frequency bands; and listening in to the second frequency band group.

Optionally, the acquiring p first frequency band from the listening frequency band set to form the frequency band group after receiving the listening frequency band set includes: after receiving the listening frequency band set sent from the base station, acquiring the p first frequency bands with the highest listening priority from the listening frequency band set according to the priority information, so as to form the first frequency band group.

Optionally, the priority information is a preset information.

Optionally, the priority information is sent to the UE by the base station through the channel occupation time COT deployed for the UE.

Optionally, the priority information is sent to the UE from the base station through a higher layer signaling or a physical layer signaling.

Optionally, the UE includes m radio frequency modules, m is a positive integer, each of the radio frequency modules corresponds to a frequency band set, and said radio frequency module is used for listening in to frequency bands in a corresponding frequency band set, where the frequency band set includes at least one frequency band in the listening frequency band set, and the listening priority of the frequency bands in the frequency band set is the same as the listening priority of the radio frequency module corresponding to the frequency band set; the priority information is obtained according to the listening priorities of the m radio frequency modules.

Optionally, the listening in to the second frequency band group in response to determining that the p first frequency bands are all occupied through the listening includes: in response to continuously determining for n times that the p first frequency bands are all occupied, listening in to the second frequency band group, where n is a preset number of times of listening in to the first frequency band group, and n is a positive integer.

Optionally, the number of times n of listening in to the first frequency band group is sent to the UE by the base station through a high layer signaling or a physical layer signaling.

Optionally, the listening in to the second frequency band group in response to determining that the p first frequency bands are all occupied through the listening includes: in response to determining that the p first frequency bands are all occupied within a target duration, listening in to the second frequency band group.

Optionally, the priority information is sent to the UE from the base station through a higher layer signaling or a physical layer signaling.

A second aspect of the embodiments of the present disclosure provides a listening method, including:

sending a listening frequency band set to user equipment (UE), where the listening frequency band set includes at least two frequency bands on an unlicensed spectrum required to be listened by the UE;

sending priority information to the UE, where the priority information is used for indicating listening priorities of the frequency bands included in the listening frequency band set;

where the UE is configured to listen in to a first frequency band group, and when it is determined that the p first frequency bands are all occupied, listen in to a second frequency band group, where the first frequency band group includes p first frequency bands, and the second frequency band group includes q second frequency bands, p and q are positive integers, the first frequency bands and the second frequency bands are in the listening frequency band set, and the listening priority of the first frequency bands is higher than the listening priority of the second frequency bands.

Optionally, the first frequency bands and the second frequency bands are on different component carriers (CC); or the first frequency bands and the second frequency bands are in different bandwidth parts (BWP).

Optionally, the listening frequency band set is sent to the UE from the base station after the UE accesses and operates on the unlicensed spectrum.

Optionally, the priority information is sent to the UE by the base station through the channel occupation time COT deployed for the UE.

Optionally, the priority information is sent to the UE from the base station through a higher layer signaling or a physical layer signaling.

A third aspect of the embodiments of the present disclosure provides a listening device, including:

a first listening module, configured to listen in to a first frequency band group, where the first frequency band group includes p first frequency bands, and p is a positive integer; and a second listening module, configured to listen in to a second frequency band group in response to determining that the p first frequency bands are all occupied, where the second frequency band group includes q second frequency bands, and q is a positive integer;

the first frequency bands and the second frequency bands are on unlicensed spectrum, and a listening priority of the first frequency bands is higher than the listening priority of the second frequency bands.

Optionally, the first frequency bands and the second frequency bands are on different CCs; or the first frequency bands and the second frequency bands are in different BWPs Optionally, the device further includes a receiving module, configured to receive a listening frequency band set sent from a base station, where the listening frequency band set includes at least two frequency bands on the unlicensed spectrum required to be listened by the UE, and the listening frequency band set includes the p first frequency bands and the q second frequency bands;

where the first listening module is further configured to:

after receiving the listening frequency band set sent from the base station, acquire the p first frequency bands from the listening frequency band set to form the first frequency band group; and listen in to the first frequency band group.

Optionally, the listening frequency band set is sent to the UE from the base station after the UE accesses and operates on the unlicensed spectrum.

Optionally, the device further includes: an acquiring module, configured to acquire priority information, where the priority information is used for indicating the listening priorities of the frequency bands included in the listening frequency band set;

the second listening module is further configured to: in response to determining that the p first frequency bands are all occupied, acquire the q second frequency bands, the listening priority of which is lower than the first frequency band, from the listening frequency band set according to the priority information, so as to form the second frequency band group; and listen the second frequency band group.

Optionally, the first listening module is further configured to: after receiving the listening frequency band set sent from the base station, acquire the p first frequency bands with the highest listening priority from the listening frequency band set according to the priority information, so as to form the first frequency band group.

Optionally, the priority information is a preset information.

Optionally, the priority information is sent to the UE by the base station through the channel occupation time COT deployed for the UE.

Optionally, the priority information is sent to the UE from the base station through a higher layer signaling or a physical layer signaling.

Optionally, the UE includes m radio frequency modules, m is a positive integer, each of the radio frequency modules corresponds to a frequency band set, and said radio frequency module is used for listening in to frequency bands in a corresponding frequency band set, where the frequency band set includes at least one frequency band in the listening frequency band set, and the listening priority of the frequency bands in the frequency band set is the same as the listening priority of the radio frequency module corresponding to the frequency band set; the priority information is obtained according to the listening priorities of the m radio frequency modules.

Optionally, the second listening module is further configured to: in response to continuously determining for n times that the p first frequency bands are all occupied, listen in to the second frequency band group, where n is a preset number of times of listening in to the first frequency band group, and n is a positive integer.

Optionally, the number of times n of listening in to the first frequency band group is sent to the UE by the base station through a high layer signaling or a physical layer signaling.

Optionally, the second listening module is further configured to: in response to determining that the p first frequency bands are all occupied within a target duration, listen in to the second frequency band group.

Optionally, the target duration is sent to the UE from the base station through a higher layer signaling or a physical layer signaling.

A fourth aspect of the embodiments of the present disclosure provides a listening device, including:

a first sending module, configured to send a listening frequency band set to user equipment (UE), where the listening frequency band set includes at least two frequency bands on an unlicensed spectrum required to be listened by the UE;

a second sending module, configured to send priority information to the UE, where the priority information is used for indicating listening priorities of the frequency bands included in the listening frequency band set;

where the UE is configured to listen in to a first frequency band group, and when it is determined that the p first frequency bands are all occupied, listen in to a second frequency band group, where the first frequency band group includes p first frequency bands, and the second frequency band group includes q second frequency bands, p and q are positive integers, where the first frequency bands and the second frequency bands are in the listening frequency band set, and the listening priority of the first frequency bands is higher than the listening priority of the second frequency bands.

Optionally, the first frequency bands and the second frequency bands are on different component carriers (CC); or the first frequency bands and the second frequency bands are in different bandwidth parts (BWP).

Optionally, the listening frequency band set is sent to the UE from the base station after the UE accesses and operates on the unlicensed spectrum.

Optionally, the priority information is sent to the UE by the base station through the channel occupation time COT deployed for the UE.

Optionally, the priority information is sent to the UE from the base station through a higher layer signaling or a physical layer signaling.

A fifth aspect of the embodiments according to the present disclosure provides user equipment, including:

a processor; and memory for storing instructions executable by the processor;

where the processor is configured to:

listen in to a first frequency band group, where the first frequency band group includes p first frequency bands, and p is a positive integer;

listen in to a second frequency band group in response to determining that the p first frequency bands are all occupied, where the second frequency band group comprises q second frequency bands, and q is a positive integer;

where the first frequency bands and the second frequency bands are on an unlicensed spectrum, and a listening priority of the first frequency bands is higher than the listening priority of the second frequency bands.

A sixth aspect of the embodiments of the present disclosure provides a base station, including:

a processor; and memory for storing instructions executable by the processor;

where the processor is configured to:

send a listening frequency band set to user equipment (UE), the listening frequency band set includes at least two frequency bands on an unlicensed spectrum required to be listened by the UE;

send priority information to the UE, wherein the priority information is used for indicating listening priorities of the frequency bands included in the listening frequency band set;

where the UE is configured to listen in to a first frequency band group, and when it is determined that the p first frequency bands are all occupied, listen in to a second frequency band group, wherein the first frequency band group includes p first frequency bands, and the second frequency band group includes q second frequency bands, p and q are positive integers, the first frequency bands and the second frequency bands are in the listening frequency band set, and the listening priority of the first frequency bands is higher than the listening priority of the second frequency bands.

A seventh aspect of the embodiments of the present disclosure provides a listening system including the listening device according to any one of the third aspect and the listening device according to any one of the fourth aspect.

An eighth aspect of the embodiments of the present disclosure provides a computer-readable storage medium, where a computer program is stored in the computer-readable storage medium, the computer program, when executed by a processing component, causes the processing component to perform any one of the listening methods according to the first aspect described above, or, the computer program, when executed by a processing component, causes the processing component to perform any one of the listening methods according to the second aspect described above.

The technical solutions provided by the embodiments of the present disclosure may at least have the following beneficial effects.

The p first frequency bands with a higher listening priority on the unlicensed spectrum are listened, and when it is detected that the p first frequency bands are all occupied, q second frequency bands on the unlicensed spectrum are listened, where the listening priority of the second frequency bands is lower than the listening priority of the first frequency bands. In this way, the UE operating on the unlicensed spectrum can first listen in to the p first frequency bands with higher priority on the unlicensed spectrum, and then listen in to the q second frequency bands with relative lower priority when it is determined that all the p first frequency bands are occupied (i.e., when the UE fails to transmit communication data through the p first frequency bands), so as to transmit communication data through the q second frequency bands. Thus, the number of frequency bands simultaneously listened by the UE is reduced, thereby reducing energy consumed by the UE for listening in to the frequency bands on the unlicensed spectrum.

It should be understood that the above general description and the following detailed description are only exemplary and explanatory, and not intended to limit the present disclosure.

BRIEF DESCRIPTION OF THE DRAWINGS

The drawings herein are incorporated into the specification and constitute a part of the disclosure, show embodiments that conform to the disclosure and together with the specification are used to explain the principle of the disclosure.

DETAILED DESCRIPTION

The embodiments of the present disclosure will be described below in in detail with reference to the accompanying drawings. to make the objective, technical solutions and advantages of the present disclosure clearer.

Exemplary embodiments will be described in detail here, and examples thereof are shown in the accompanying drawings. The following description refers to the same or similar elements in the different figures unless otherwise indicated. The embodiments described in the following exemplary embodiments do not represent all embodiments consistent with the present disclosure. Instead, they are merely examples of devices and methods consistent with aspects of the present disclosure as detailed in the appended claims.

Currently, with the development of wireless communication technology, more and more communication systems can operate on unlicensed spectrums. In most cases, a Listen Before Talk (LBT) mechanism is generally adopted for the communication on the unlicensed spectrum. That is, the device needs to listen in to the frequency bands on the unlicensed spectrum before transmitting communication data. A frequency band can be occupied for transmitting communication data only when being determined as idle. Moreover, a duration that the device occupies the frequency band cannot exceed the maximum channel occupancy time (MCOT) or channel occupancy time (COT). When the duration that the frequency band is occupied reaches MCOT or COT, the device needs to perform LBT again.

In practical applications, user equipment (UE) operating on an unlicensed spectrum usually needs to listen in to multiple frequency bands on the unlicensed spectrum simultaneously. For example, in the fifth generation of mobile communication technology (5G) system, since the 5G communication system has application scenario with large bandwidth, the UE in the 5G communication system usually needs to listen in to multiple frequency bands on the unlicensed spectrum simultaneously.

The multiple frequency bands may be located on different component carriers (CC), or the multiple frequency bands may be in different bandwidth parts (BWP).

Figure 1:
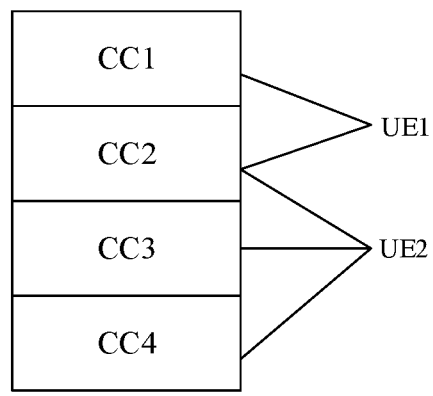
FIG. 1 is a schematic diagram illustrating that UE listens in to multiple frequency bands on an unlicensed spectrum simultaneously.
Figure 2:
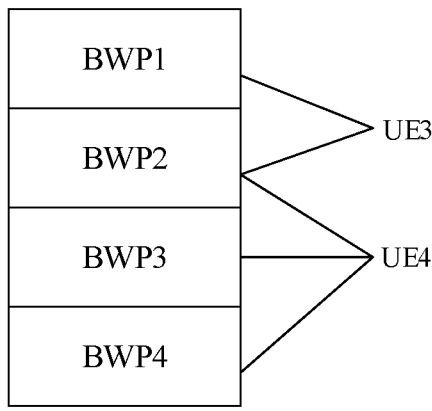
FIG. 2 is a schematic diagram illustrating that UE listens in to multiple frequency bands on an unlicensed spectrum simultaneously.

FIG. 1 and FIG. 2 are schematic diagrams illustrating that UE listens in to multiple frequency bands on an unlicensed spectrum simultaneously. As shown in FIG. 1, UE1 needs to listen in to CC1 and CC2 on the unlicensed spectrum simultaneously, and UE2 needs to listen in to CC2, CC3 and CC4 on the unlicensed spectrum simultaneously. As shown in FIG. 2, UE3 needs to listen in to BWP1 and BWP2 on the unlicensed spectrum simultaneously, and UE4 needs to listen in to BWP2, BWP3 and BWP4 on the unlicensed spectrum simultaneously.

However, more power consumption will be caused by simultaneously listening in to multiple frequency bands through the UE, and the standby time of the UE is affected. Moreover, in practical applications, communication data of the UE is usually transmitted on a part of the frequency bands listened by the UE, rather than all the frequency bands listened by the UE.

Some embodiments of the present disclosure provide a listening method capable of reducing energy consumed by the UE while listening in to frequency bands on the unlicensed spectrum. In the listening method, the UE can listen in to p first frequency bands with a higher listening priority on the unlicensed spectrum, and when it is detected that the p first frequency bands are all occupied, q second frequency bands on the unlicensed spectrum are listened, where the listening priority of the second frequency bands is lower than the listening priority of the first frequency bands. In this way, the UE operating on the unlicensed spectrum can first listen in to the p first frequency bands with higher priority on the unlicensed spectrum, and then listen in to the q second frequency bands with relative lower priority when it is determined that all the p first frequency bands are occupied (i.e., when the UE fails to transmit communication data through the p first frequency bands), thereby trying to transmit communication data through the q second frequency bands. Thus, the number of frequency bands simultaneously listened by the UE is reduced, thereby reducing energy consumed by the UE for listening in to the frequency bands on the unlicensed spectrum.

An application environment related to the listening method provided in the embodiments of the present disclosure will be described below.

Figure 3:
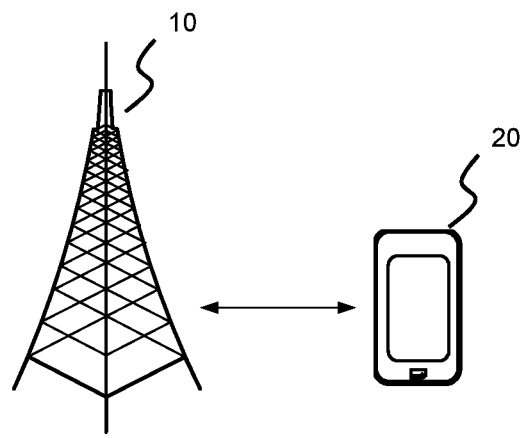
FIG. 3 is a schematic diagram showing an implementation environment according to an exemplary embodiment.

FIG. 3 is a schematic diagram of the application environment related to the listening method provided by the embodiments of the disclosure. As shown in FIG. 3, the application environment may include a base station 10 and UE 20. The base station 10 and the UE 20 may be connected to each other through a communication network, and the UE 20 is any UE in a cell served by the base station 10.

The communication network may be a 5G communication network, a Long Term Evolution (LTE) communication network, or other communication networks similar to the LTE communication network or the 5G communication network.

Figure 4:
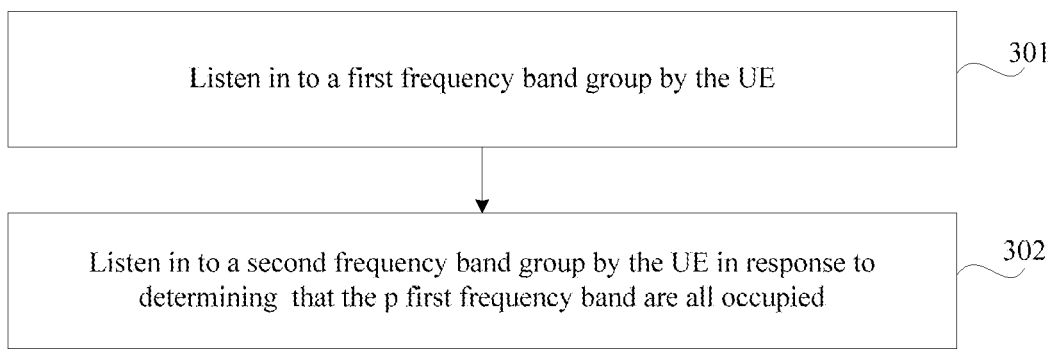
FIG. 4 is a flow diagram showing a listening method according to an exemplary embodiment.

FIG. 4 is a flowchart showing a listening method according to an exemplary embodiment. The listening method can be applied to the UE 20 shown in FIG. 3. As shown in FIG. 4, the listening method may include the following steps.

In Step 301, the UE listens in to a first frequency band group.

The first frequency band group includes p first frequency bands, and p is a positive integer;

In Step 302, the UE listens in to a second frequency band group in response to determining that the p first frequency band are all occupied.

The second frequency group includes q second frequency bands, and q is a positive integer. All of the first frequency bands and the second frequency bands are on an unlicensed frequency spectrum, and a listening priority of the first frequency bands is higher than a listening priority of the second frequency bands.

As stated above, in the listening method provided by the embodiments of the present disclosure, p first frequency bands with a higher listening priority on the unlicensed spectrum are listened, and when it is determined that the p first frequency bands are all occupied, q second frequency bands on the unlicensed spectrum are listened, where the listening priority of the second frequency bands is lower than the listening priority of the first frequency bands. In this way, the UE operating on the unlicensed spectrum can first listen in to the p first frequency bands with higher priority on the unlicensed spectrum, and then listen in to the q second frequency bands with relative lower priority when it is determined that the p first frequency bands are all occupied (i.e., when the UE fails to transmit communication data through the p first frequency bands), so as to transmit communication data through the q second frequency bands. Thus, the number of frequency bands simultaneously listened by the UE is reduced, thereby reducing energy consumed by the UE for listening in to the frequency bands on the unlicensed spectrum.

Figure 5:
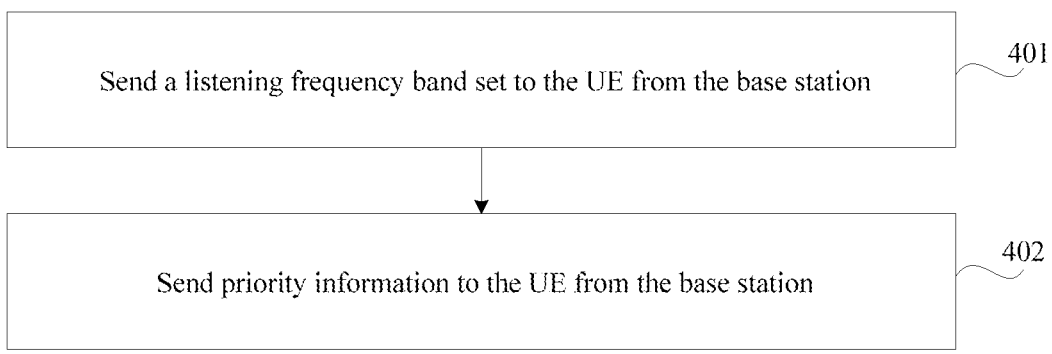
FIG. 5 is a flow diagram showing a listening method according to an exemplary embodiment.

FIG. 5 is a flow chart showing a listening method according to an exemplary embodiment. The listening method may be applied to the base station 10 shown in FIG. 3. As shown in FIG. 5, the listening method may include the following steps.

In Step 401, the base station sends a listening frequency band set to the UE.

The listening frequency band set includes at least two frequency bands on the unlicensed spectrum required to be listened by the UE.

In Step 402, the base station sends priority information to the UE.

The priority information is used for indicating listening priorities of the frequency bands included in the listening frequency band set. The UE is configured to listen in to a first frequency band group, and listen in to a second frequency band group when it is determined that p first frequency bands are all occupied, where the first frequency band group includes p first frequency bands, and the second frequency band group includes q second frequency bands, p and q are both positive integers. The first frequency bands and the second frequency bands are in the listening frequency band set, and the listening priority of the first frequency bands is higher than that of the second frequency bands.

As stated above, in the listening method provided by the embodiments of the present disclosure, the listening frequency band set and the priority information are sent to the UE, where the listening frequency band set includes at least two frequency bands on the unlicensed spectrum required to be listened by the UE, and the priority information is used for indicating the listening priorities of the frequency bands included in the listening frequency band set, so that the UE can listen in to p first frequency bands with higher listening priority in the listening frequency band set according to the listening frequency band set and the priority information, and when it is determined that the p first frequency bands are all occupied, q second frequency bands in the listening frequency band set are listened, where the listening priority of the second frequency bands is lower than the listening priority of the first frequency bands. In this way, the UE operating on the unlicensed spectrum can first listen in to the p first frequency bands with higher priority on the unlicensed spectrum, and then listen in to the q second frequency bands with relative lower priority when it is determined that the p first frequency bands are all occupied (i.e., when the UE fails to transmit communication data through the p first frequency bands), so as to transmit communication data through the q second frequency bands. Thus, the number of frequency bands simultaneously listened by the UE is reduced, thereby reducing energy consumed by the UE for listening in to the frequency bands on the unlicensed spectrum.

Figure 6:
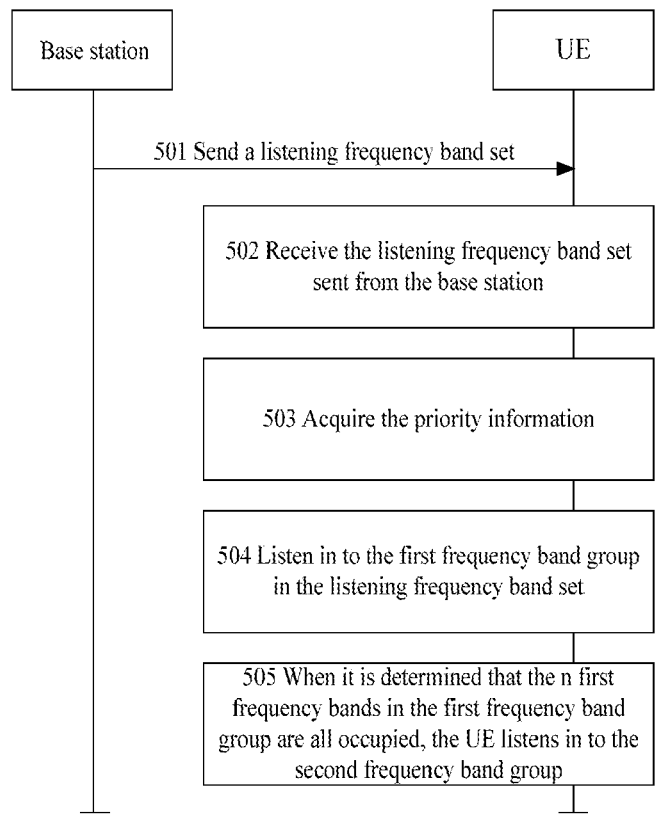
FIG. 6 is a flow diagram showing a listening method according to an exemplary embodiment.

FIG. 6 is a flowchart showing a listening method according to an exemplary embodiment. The listening method may be applied to the application environment shown in FIG. 3. As shown in FIG. 6, the listening method may include the following steps.

In Step 501, the base station sends a listening frequency band set to the UE.

In embodiments of the present disclosure, the base station may send the listening frequency band set to the UE after the UE accesses and operates on the unlicensed spectrum. The listening frequency band set includes at least two frequency bands on the unlicensed spectrum required to be listened by the UE. The at least two frequency bands may be located on different CC, or at least two frequency bands may be in different bandwidth parts (BWP).

Generally, the UE operates on the unlicensed spectrum after receiving a work instruction information sent from the base station. The work instruction information is used for instructing the UE to listen in to the frequency bands on the unlicensed spectrum, and transmitting communication data through a certain frequency band when it is determined that the frequency band is idle (that is, being not occupied).

Through sending the listening frequency band set to the UE from the base station, the UE can acquire the frequency bands on the unlicensed spectrum that need to be listened, and the UE is prevented from listening in to all the frequency bands on the unlicensed spectrum, thereby reducing the listening power consumption of the UE.

In Step 502, the UE receives the listening frequency band set sent from the base station.

After the base station sends the listening frequency band set, the UE can receive the listening frequency band set.

In Step 503, the UE acquires the priority information.

The priority information is used for indicating the listening priority of the frequency bands included in the listening frequency band set. For example, the listening frequency band set includes 3 frequency bands, namely frequency band 1, frequency band 2, and frequency band 3. The priority information can indicate that the listening priority of frequency band 1 is high priority, the listening priority of frequency band 2 is medium priority, and the listening priority of frequency band 3 is low priority.

In subsequent steps, the UE can preferentially listen in to frequency bands with higher listening priority in the listening frequency band set, and when it is determined that the frequency bands with higher listening priority are occupied, frequency bands with lower listening priority in the listening frequency band set are listened. In this way, the number of frequency bands simultaneously listened by the UE is reduced, thereby reducing energy consumed by the UE for listening in to the frequency bands on the unlicensed spectrum.

The embodiments of the present disclosure provide three exemplary manners of acquiring the priority information by the UE, which will be described separately below.

In the first manner, the priority information may be a preset information. For example, the priority information may be specified in the communication standard. In this case, the UE can acquire the priority information according to regulations of a communication system. By setting the priority information in advance, the steps used by the UE for acquiring the priority information can be simplified, so that the listening efficiency of the UE on the frequency bands on the unlicensed spectrum can be improved to a certain extent.

In the second manner, the priority information may be sent to the UE by the base station through the COT deployed for the UE. In this case, the UE can acquire the priority information by receiving the priority information sent by the base station.

During a period from the time that the UE starts to operate on the unlicensed spectrum to the time that the UE actually occupies the frequency band on the unlicensed spectrum to transmit communication data, the listening priorities of the frequency bands may change. Therefore, in order to ensure the instantaneity of the priority information obtained by the UE, the base station can send priority information to the UE through the COT deployed for the UE.

Optionally, the priority information may be sent by the base station through a higher layer signaling or a physical layer signaling.

In the third manner, the UE may acquire the priority information according to the listening priorities of m radio frequency modules included in the UE, and m is a positive integer.

In this manner, each radio frequency module of the UE corresponds to a frequency band set. The frequency band set includes at least one frequency band in the above mentioned listening frequency band set, and the radio frequency module of the UE is used for listening the frequency bands in a corresponding frequency band set. For example, the UE may include two radio frequency modules, namely radio frequency (RF) module 1 and radio frequency module 2. Radio frequency module 1 corresponds to frequency band set 1, and frequency band set 1 includes frequency band 1, which is in the above mentioned listening frequency band set. RF Module 1 is used for listening in to the frequency bands in frequency band set 1. RF module 2 corresponds to frequency band set 2. The frequency band set 2 includes frequency band 2, frequency band 3 and frequency band 4, and frequency band 2, frequency band 3 and frequency band 4 are in the above listening frequency band set. RF module 2 is used for listening in to the frequency bands in the frequency band set 2.

Each RF module of the UE has a listening priority, where the listening priority of the RF module of the UE is the same as the listening priority of a frequency band in the frequency band set corresponding to the radio frequency module. For example, if the listening priority of RF module 1 is high priority, the listening priority of frequency band 1 in the frequency band set 1 corresponding to RF module 1 is also high priority.

The UE may obtain the above priority information according to the listening priorities of m RF modules included in the UE. That is, the UE may obtain the listening priority of the frequency band in the frequency band set corresponding to each RF module, then obtain the priority information according to the listening priority of the frequency band in the frequency band set corresponding to each radio frequency module.

Since the listening priority of the UE's RF module is the same as the listening priority of the frequency bands in the frequency band set corresponding to the RF module, merely one corresponding radio frequency module is enabled by the UE when multiple frequency bands with the same listening priority are listened, which can reduce the power consumption of the UE during listening.

Moreover, when switching from listening multiple frequency bands of a certain listening priority to listening multiple frequency bands of another listening priority, the UE only needs to disable the radio frequency module corresponding to the frequency band set including the multiple frequency bands of the certain listening priority, and enable the radio frequency module corresponding to the frequency band set including the multiple frequency bands of the another listening priority, which is not only convenient in operation, but also fast in response.

In Step 504, the UE listens in to the first frequency band group in the listening frequency band set.

The first frequency band group includes p first frequency bands. Optionally, the listening priorities of the p first frequency bands may be the same.

Optionally, when the UE starts to listen in to the frequency bands in the listening frequency band set (that is, in the case that the UE has not listened in to any frequency bands in the listening frequency band set previously), the UE may form the first frequency band group by acquiring, based on the priority information obtained in step 503, the p first frequency bands with the highest listening priority from the listening frequency band set; and listen in to the first frequency band group.

Optionally, when the UE has listened in to the frequency bands in the listening frequency band set (that is, in the case that the UE has listened in to a certain frequency band group in the listening frequency band set previously and it is determined that the frequency bands in the certain frequency band group are all occupied), the UE may form the first frequency band group by acquiring, according to the listening priority of the frequency bands included in the certain frequency band group, p first frequency bands from the listening frequency band set, and listen in to the first frequency band group. The listening priority of the p first frequency bands is lower than the listening priority of the frequency bands included in the certain frequency band group.

In Step 505, when it is determined that the p first frequency bands in the first frequency band group are all occupied, the UE listens in to the second frequency band group.

The second frequency band group includes q second frequency bands.

When it is determined that the p first frequency bands in the first frequency band group are all occupied, the UE may acquire q second frequency bands from the listening frequency band set according to the priority information obtained in step 503, so as to form the second frequency band group, where the listening priority of the second frequency band is lower than the listening priority of the first frequency band. Then, the UE can listen in to the second frequency band group.

In an embodiment of the present disclosure, after listening in to the second frequency band group, the UE may still continue to listen in to the first frequency band group.

In a possible implementation manner, after it has been continuously determined for n times that p first frequency bands in the first frequency band group are all occupied, the UE may listen in to the second frequency band group, where n is a positive integer.

In another possible implementation manner, after it is determined that p first frequency bands in the first frequency band group are all occupied within a target duration, the UE listens in to the second frequency band group.

The UE will listen in to the second frequency band group only when the p first frequency bands have been determined for multiple times as being occupied, or when the p first frequency bands have been determined as all being occupied for a continuous period. In this way, the probability that the second frequency band group is required to be listened by the UE is reduced, and unnecessary listening of the second frequency band group is avoided, thereby reducing the power consumed by the UE for listening in to the frequency bands on the unlicensed spectrum.

Both the target duration and n can be sent to the UE from the base station through high-level signaling or physical layer signaling.

It should be noted that the first frequency band group and the second frequency band group may or may not have an intersection, which is not limited in the embodiments of the present disclosure.

In order to facilitate readers to understand the technical solutions provided by the embodiments of the present disclosure, the listening method provided by the embodiments of the present disclosure will be exemplify illustrated below based on the embodiments of the present disclosure in conjunction with the schematic diagram shown in FIG. 7.

Figure 7:
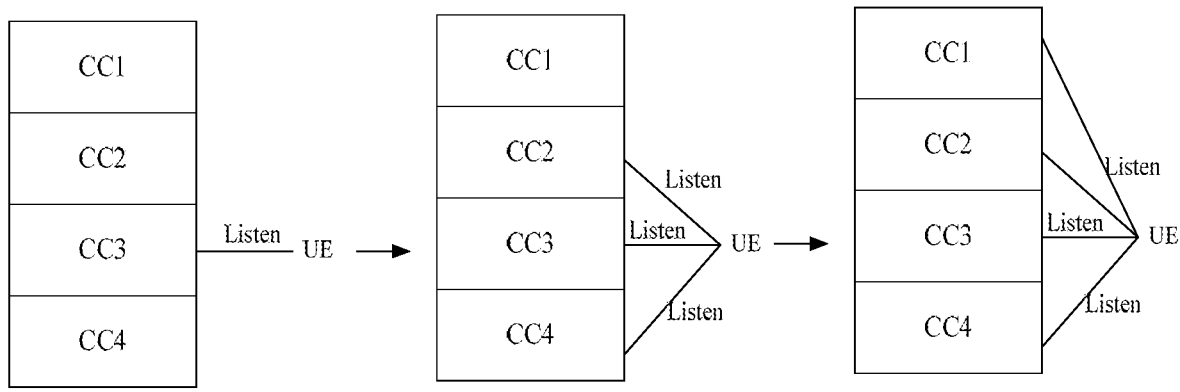
FIG. 7 is a schematic diagram showing that the UE listens in to frequency bands on an unlicensed spectrum according to an exemplary embodiment.

As shown in FIG. 7, when the UE starts to listen in to the frequency bands on the unlicensed spectrum, the UE can first listen in to CC3 with the highest listening priority. In response to CC3 being continuously determined as being occupied for two times, the UE can listen in to CC2 and CC4 with the secondary high priority, meanwhile the UE can continue to listen in to CC3. In response to all of CC2, CC3, and CC4 being continuously determined as being occupied for two times, the UE can listen in to CC1 with the lowest listening priority, meanwhile the UE can continue to listen in to CC2, CC3, and CC4.

As stated above, in the listening method provided by the embodiments of the present disclosure, p first frequency bands with a higher listening priority on the unlicensed spectrum are listened, and when it is determined that the p first frequency bands are all occupied, q second frequency bands on the unlicensed spectrum are listened, where the listening priority of the second frequency bands is lower than the listening priority of the first frequency bands. In this way, the UE operating on the unlicensed spectrum can first listen in to the p first frequency bands with higher priority on the unlicensed spectrum, and then listen in to the q second frequency bands with relative lower priority when it is determined that the p first frequency bands are all occupied (i.e., when the UE fails to transmit communication data through the p first frequency bands), so as to transmit communication data through the q second frequency bands. Thus, the number of frequency bands simultaneously listened by the UE is reduced, thereby reducing energy consumed by the UE for listening in to the frequency bands on the unlicensed spectrum.

Figure 8:
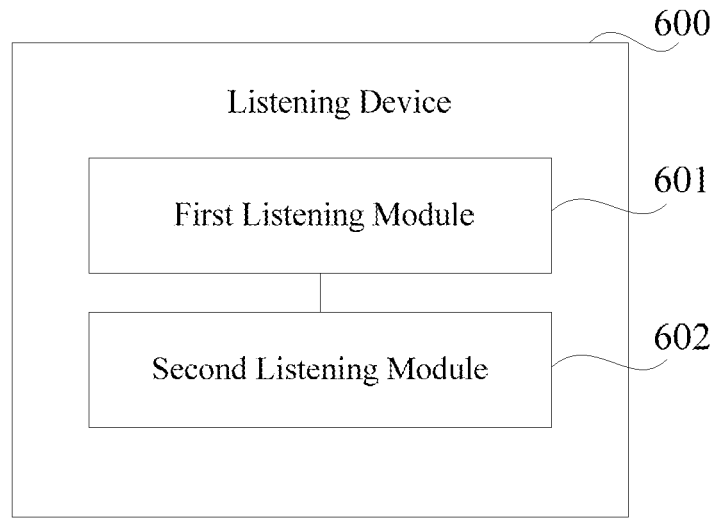
FIG. 8 is a block diagram showing a listening device according to an exemplary embodiment.

FIG. 8 is a block diagram showing a listening device 600 according to an exemplary embodiment. The listening device 600 may be provided in the UE 20 shown in FIG. 3. Referring to FIG. 8, the listening device 600 includes a first listening module 601 and a second listening module 602.

The first listening module 601 is configured to listen in to a first frequency band group, where the first frequency band group includes p first frequency bands, and p is a positive integer.

The second listening module 602 is configured to listen in to a second frequency band group when it is determined that the p first frequency bands are all occupied. The second frequency band group includes q second frequency bands, and q is a positive integer. The first frequency bands and the second frequency bands are on an unlicensed frequency spectrum, and the listening priority of the first frequency bands is higher than the listening priority of the second frequency bands.

In an embodiment of the present disclosure, the first frequency bands and the second frequency bands are on different component carriers (CC); or, the first frequency bands and the second frequency bands are on different bandwidth parts (BWP).

In an embodiment of the present disclosure, the second listening module 602 is specifically configured to listen in to the second frequency band group when all of the p first frequency bands in the first frequency band group are contentiously determined as being occupied for n times, where n is a preset number of times o listening in to the first frequency band group, and n is a positive integer.

In an embodiment of the present disclosure, the number of times n of listening in to the first frequency band group is sent to the UE from the base station through a high-level signaling or a physical layer signaling.

In an embodiment of the present disclosure, the second listening module 602 is specifically configured to listen in to the second frequency band group when it is determined that the p first frequency bands included in the first frequency band group are all occupied within a target duration.

In an embodiment of the present disclosure, the target duration is sent to the UE from the base station through a high-level signaling or a physical layer signaling.

Figure 9:
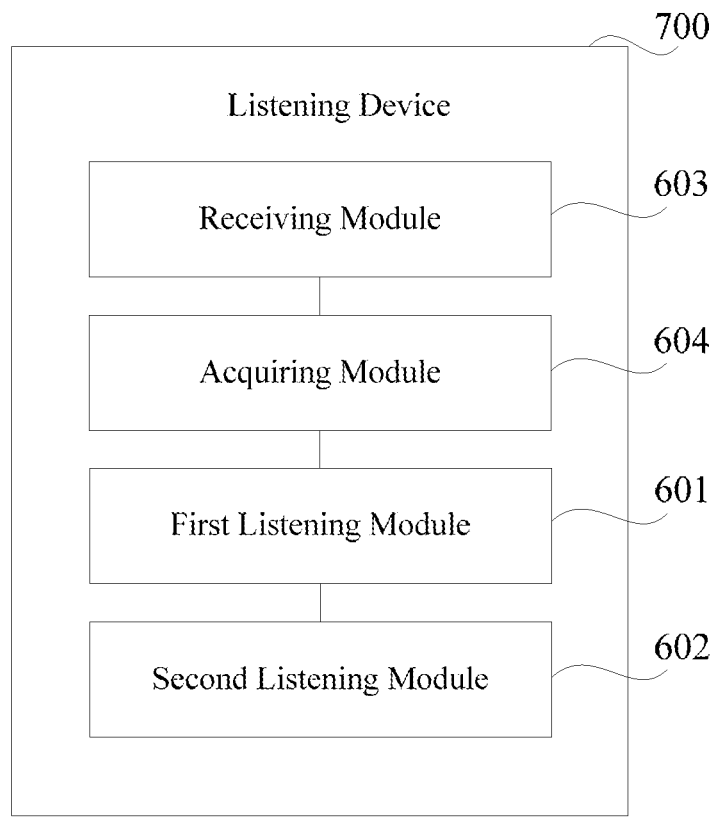
FIG. 9 is a block diagram showing a listening device according to an exemplary embodiment.

An embodiment of the present disclosure further provides another listening device 700. As shown in FIG. 9, the listening device 700 includes a receiving module 603 and an acquiring module 604 in addition to the modules included in the listening device 600.

The receiving module 603 is configured to receive a listening frequency band set sent from a base station. The listening frequency band set includes at least two frequency bands on an unlicensed spectrum required to be listened by the UE, and the listening frequency band set includes the p first frequency bands and the q second frequency bands.

Accordingly, the first listening module 601 is specifically configured to: form the first frequency band group by acquiring the p first frequency bands from the listening frequency band set after the listening frequency band set sent from the base station is received; and listen in to the first frequency band group.

In an embodiment of the present disclosure, the listening frequency band set is sent to the UE by the base station after the UE accesses and operates on the unlicensed spectrum.

The acquiring module 604 is configured to acquire priority information, where the priority information is used for indicating the listening priority of the frequency bands included in the listening frequency band set.

Accordingly, the second listening module 602 is specifically configured to: when the p first frequency bands are determined as all being occupied, form the second frequency band group by acquiring q second frequency bands from the listening frequency band set according to the priority information, where the listening priority of the q second frequency bands is lower than that of the first frequency band; and listen in to the second frequency band group.

Accordingly, the first listening module 601 is specifically configured to, after receiving the listening frequency band set sent by the base station, acquire the p first frequency bands with the highest listening priority from the listening frequency band set according to the priority information, so as to form the first frequency band group.

In an embodiment of the present disclosure, the priority information is a preset information.

In an embodiment of the present disclosure, the priority information is sent to the UE by the base station through the channel occupation time COT deployed for the UE.

In an embodiment of the present disclosure, the priority information is sent to the UE from the base station through a high-level signaling or a physical layer signaling.

In an embodiment of the present disclosure, the UE includes m radio frequency modules, m is a positive integer. Each radio frequency module corresponds to a frequency band set, and the radio frequency module is used for listening in to the frequency bands in the corresponding frequency band set. The frequency band set includes at least one frequency band in the listening frequency band set, and the listening priority of the frequency bands in the frequency band set is the same as the listening priority of the radio frequency module corresponding to the frequency band set. The priority information is obtained based on the listening priorities of the m radio frequency modules.

As stated above, in the listening device provided by the embodiments of the present disclosure, p first frequency bands with a higher listening priority on the unlicensed spectrum are listened, and when it is determined that the p first frequency bands are all occupied, q second frequency bands on the unlicensed spectrum are listened, where the listening priority of the second frequency bands is lower than the listening priority of the first frequency bands. In this way, the UE operating on the unlicensed spectrum can first listen in to the p first frequency bands with higher priority on the unlicensed spectrum, and then listen in to the q second frequency bands with relative lower priority when it is determined that the p first frequency bands are all occupied (i.e., when the UE fails to transmit communication data through the p first frequency bands), so as to transmit communication data through the q second frequency bands. Thus, the number of frequency bands simultaneously listened by the UE is reduced, thereby reducing energy consumed by the UE for listening in to the frequency bands on the unlicensed spectrum.

Figure 10:
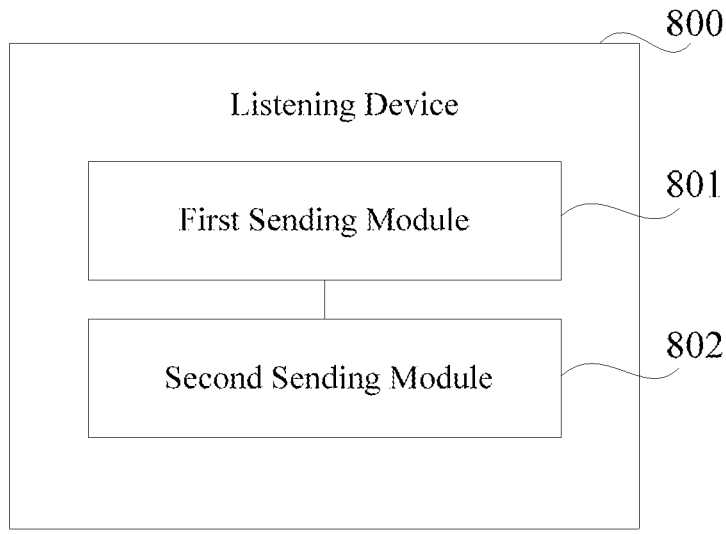
FIG. 10 is a block diagram showing a listening device according to an exemplary embodiment.

FIG. 10 is a block diagram showing a listening device 800 according to an exemplary embodiment. The listening device 800 may be provided in the base station 10 shown in FIG. 3. Referring to FIG. 10, the listening device 800 includes a first sending module 801 and a second sending module 802.

The first sending module 801 is configured to send a listening frequency band set to the UE. The listening frequency band set includes at least two frequency bands on an unlicensed spectrum required to be listened by the UE.

The second sending module 802 is configured to send priority information to the UE. The priority information is used for indicating the listening priority of the frequency bands included in the listening frequency band set.

The UE is configured to listen in to a first frequency band group, and listen in to a second frequency band group when it is determined that p first frequency bands are all occupied, where the first frequency band group includes p first frequency bands, and the second frequency band group includes q second frequency bands, p and q are both positive integers. The first frequency bands and the second frequency bands are in the listening frequency band set, and the listening priority of the first frequency bands is higher than that of the second frequency bands.

In an embodiment of the present disclosure, the first frequency bands and the second frequency bands are on different component carriers (CC); or, the first frequency bands and the second frequency bands are on different bandwidth parts (BWP).

In an embodiment of the present disclosure, the listening frequency band set is sent to the UE by the base station after the UE accesses and operates on the unlicensed spectrum.

In an embodiment of the present disclosure, the priority information is sent by the base station to the UE through the channel occupation time COT deployed for the UE.

In an embodiment of the present disclosure, the priority information is sent to the UE from the base station through a high-level signaling or a physical layer signaling.

As stated above, through the listening device provided by the embodiments of the present disclosure, the listening frequency band set and the priority information are sent to the UE, where the listening frequency band set includes at least two frequency bands on the unlicensed spectrum required to be listened by the UE, and the priority information is used for indicating the listening priorities of the frequency bands included in the listening frequency band set, so that the UE can listen p first frequency bands with higher listening priority in the listening frequency band set according to the listening frequency band set and the priority information, and when it is determined that the p first frequency bands are all occupied, q second frequency bands in the listening frequency band set are listened, where the listening priority of the second frequency bands is lower than the listening priority of the first frequency bands. In this way, the UE operating on the unlicensed spectrum can first listen in to the p first frequency bands with higher priority on the unlicensed spectrum, and then listen in to the q second frequency bands with relative lower priority when it is determined that the p first frequency bands are all occupied (i.e., when the UE fails to transmit communication data through the p first frequency bands), so as to transmit communication data through the q second frequency bands. Thus, the number of frequency bands simultaneously listened by the UE is reduced, thereby reducing energy consumed by the UE for listening in to the frequency bands on the unlicensed spectrum.

Figure 11:
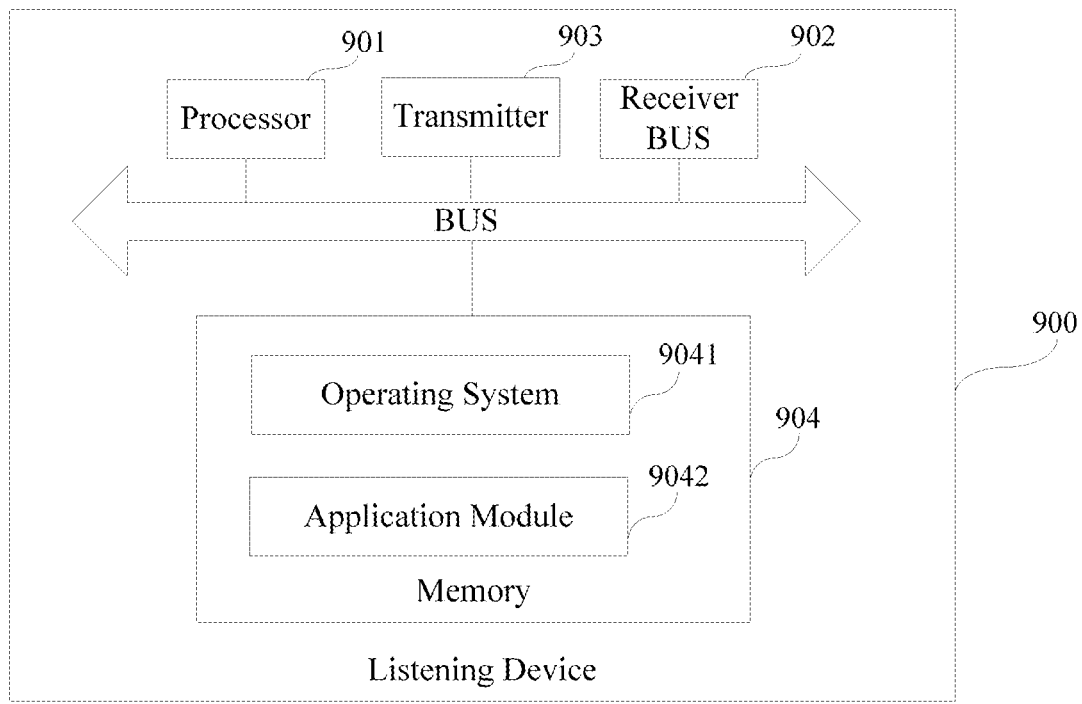
FIG. 11 is a block diagram showing a listening device according to an exemplary embodiment.

FIG. 11 is a block diagram showing a listening device 900 according to an exemplary embodiment. For example, the listening device 900 may be a base station. As shown in FIG. 11, the listening device 900 may include: a processor 901, a receiver 902, a transmitter 903, and a memory 904. The receiver 902, the transmitter 903, and the memory 904 are respectively connected to the processor 901 through a bus.

The processor 901 includes one or more processing cores, and the processor 901 is configured to execute steps executed by the base station in the listening method provided by the embodiment of the present disclosure by running a software program and modules. The memory 904 is configured to store software programs and modules. Specifically, the memory 904 may store an operating system 9041, an application module 9042 required by at least one function. The receiver 902 is configured to receive communication data sent by other devices, and the transmitter 903 is configured to send communication data to other devices.

Figure 12:
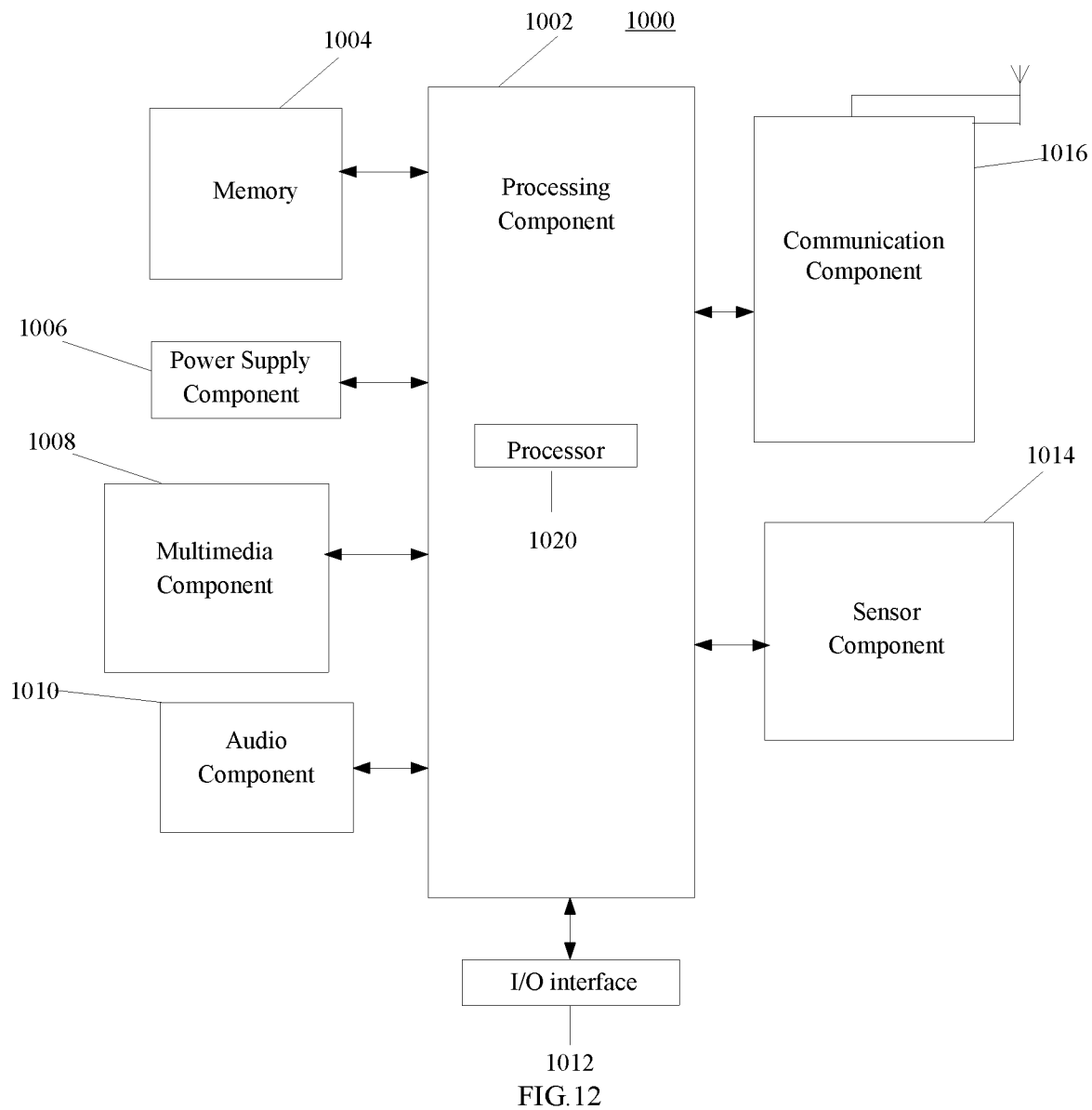
FIG. 12 is a block diagram showing a listening device according to an exemplary embodiment.

FIG. 12 is a block diagram showing a listening device 1000 according to an exemplary embodiment. For example, the device 1000 may be a mobile phone, a computer, a digital broadcasting terminal, a messaging device, a game console, a tablet device, a medical device, a fitness device, a personal digital assistant, etc.

Referring to FIG. 12, the device 1000 may include one or more of the following components: a processing component 1002, a memory 1004, a power supply component 1006, a multimedia component 1008, an audio component 1010, an input/output (I/O) interface 1012, a sensor component 1014, and a communication component 1016.

Generally, the processing component 1002 is configured to control the overall operations of the device 1000, such as operations associated with displaying, telephone calls, data communications, camera operations, and recording operations. The processing component 1002 may include one or more processors 1020 to execute instructions to complete all or part of the steps performed by the UE 20 in the foregoing method embodiments. In addition, the processing component 1002 may include one or more modules to facilitate the interaction between the processing component 1002 and other components. For example, the processing component 1002 may include a multimedia module to facilitate the interaction between the multimedia component 1008 and the processing component 1002.

The memory 1004 is configured to store various types of data to support operations in the device 1000. Examples of these data include instructions for any application or method operating on the device 1000, contact data, phone book data, messages, pictures, videos, etc. The memory 1004 can be implemented by any type of volatile or non-volatile storage device or their combination, such as static random access memory (SRAM), electrically erasable programmable read-only memory (EEPROM), erasable and Programmable read-only memory (EPROM), programmable read-only memory (PROM), read-only memory (ROM), magnetic memory, flash memory, magnetic disk or optical disk.

The power supply component 1006 is configured to provide power to various components of the device 1000. The power supply component 1006 may include a power management system, one or more power supplies, and other components associated with generating, managing, and distributing power for the device 1000.

The multimedia component 1008 includes a screen that provides an output interface between the device 1000 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor may not only sense the boundary of the touch or slide action, but also detect the duration and pressure related to the touch or slide operation. In some embodiments, the multimedia component 1008 includes a front camera and/or a rear camera. When the device 1000 is in an operation mode, such as a shooting mode or a video mode, the front camera and/or the rear camera can receive external multimedia data. Each front camera and rear camera can be a fixed optical lens system or have focal length and optical zooming capabilities.

The audio component 1010 is configured to output and/or input audio signals. For example, the audio component 1010 includes a microphone (MIC), and when the device 1000 is in an operation mode, such as a call mode, a recording mode, and a voice recognition mode, the microphone is configured to receive external audio signals. The received audio signal may be further stored in the memory 1004 or transmitted via the communication component 1016. In some embodiments, the audio component 1010 further includes a speaker for outputting audio signals.

The I/O interface 1012 provides an interface between the processing component 1002 and a peripheral interface module. The peripheral interface module may be a keyboard, a click wheel, a button, and the like. These buttons may include but are not limited to: a home button, a volume button, a start button, and a lock button.

The sensor component 1014 includes one or more sensors for providing the device 1000 with various aspects of state evaluation. For example, the sensor component 1014 can detect the on/off state of the device 1000 and the relative positioning of the components. For example, the component is the display and the keypad of the device 1000. The sensor component 1014 can also detect the position change of the device 1000 or a component of the device 1000. The presence or absence of contact between the user and the device 1000, the orientation or acceleration/deceleration of the device 1000, and the temperature change of the device 1000. The sensor assembly 1014 may include a proximity sensor configured to detect the presence of nearby objects when there is no physical contact. The sensor component 1014 may also include a light sensor used for imaging application, such as a complementary metal oxide semiconductor (CMOS) or a charge coupled device (CCD) image sensor. In some embodiments, the sensor component 1014 may also include an acceleration sensor, a gyroscope sensor, a magnetic sensor, a pressure sensor or a temperature sensor.

The communication component 1016 is configured to facilitate wired or wireless communication between the device 1000 and other devices. The device 1000 can access a wireless network based on a communication standard, such as Wi-Fi, 2G, or 3G, or a combination thereof. In an exemplary embodiment, the communication component 1016 receives a broadcast signal or broadcast related information from an external broadcast management system via a broadcast channel. In an exemplary embodiment, the communication component 1016 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the device 1000 may be implemented by one or more application specific integrated circuits (ASIC), digital signal processors (DSP), digital signal processing devices (DSPD), programmable logic devices (PLD), field programmable gate array (FPGA), a controller, a microcontroller, a microprocessor, or other electronic components, to execute the technical process performed by the UE 20 in the foregoing method embodiment.

In an exemplary embodiment, there is further provided a non-transitory computer-readable storage medium including instructions, such as a memory 1004 including instructions, which may be executed by the processor 1020 of the device 1000 to complete the UE 20 in the foregoing method embodiment. For example, the non-transitory computer-readable storage medium may be ROM, random access memory (RAM), CD-ROM, magnetic tape, floppy disk, optical data storage device, etc.

Figure 13:
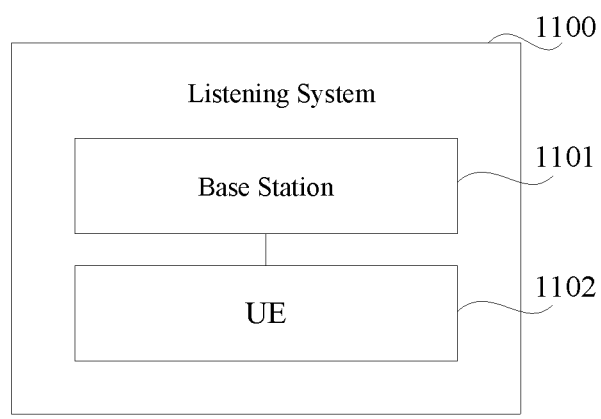
FIG. 13 is a block diagram showing a listening system according to an exemplary embodiment.

FIG. 13 is a block diagram showing a listening system 1100 according to an exemplary embodiment. As shown in FIG. 13, the listening system 1100 includes a base station 1101 and UE 1102.

Among them, the base station 1101 is used to execute the listening method executed by the base station in the embodiment shown in FIG. 6.

The UE 1102 is used to execute the listening method executed by the base station in the embodiment shown in FIG. 6.

In an exemplary embodiment, a computer-readable storage medium is further provided. The computer-readable storage medium is a non-volatile computer-readable storage medium in which a computer program is stored. When the computer program is executed by the processing component, the listening method provided in the foregoing embodiment of the present disclosure can be implemented.

The embodiments of the present disclosure further provide a computer program product. The computer program product stores instructions that, when run on a computer, enable the computer to execute the listening method provided by the embodiments of the present disclosure.

The embodiment of the present disclosure further provides a chip, which includes a programmable logic circuit and/or program instructions, and can execute the listening method provided by the embodiment of the present disclosure when the chip is running.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A listening method, comprising:
   listening in to a first frequency band group, wherein the first frequency band group comprises p first frequency bands, and p is a positive integer;
   listening in to a second frequency band group in response to determining that the p first frequency bands are all occupied, wherein the second frequency band group comprises q second frequency bands, and q is a positive integer;
   wherein
   the p first frequency bands and the q second frequency bands are on an unlicensed spectrum, and a listening priority of the p first frequency bands is higher than the listening priority of the q second frequency bands;
   the method further comprises: receiving a listening frequency band set from a base station, wherein the listening frequency band set comprises at least two frequency bands on the unlicensed spectrum required to be listened by user equipment (UE), and the listening frequency band set comprises the p first frequency bands and the q second frequency bands;
   wherein the listening in to a first frequency band group comprises:
   after receiving the listening frequency band set from the base station, acquiring the p first frequency bands form the listening frequency band set to form the first frequency band group; and
   listening in to the first frequency band group;
   the method further comprises: acquiring priority information, wherein the priority information is used for indicating listening priorities of frequency bands included in the listening frequency band set;
   wherein the listening in to a second frequency band group in response to determining that the p frequency bands are all occupied comprises:
   in response to determining that the p first frequency bands are all occupied, acquiring the q second frequency bands, the listening priority of which is lower than that of the p first frequency bands, from the listening frequency band set according to the priority information, so as to form the second frequency band group; and
   listening in to the second frequency band group.

2. The method according to claim 1, wherein the p first frequency bands and the q second frequency bands are on different component carriers (CC); or
   the p first frequency bands and the q second frequency bands are in different bandwidth parts (BWP).

3. The method according to claim 1, wherein the listening frequency band set is sent to the UE from the base station after the UE accesses and operates on the unlicensed spectrum.

4. The method according to claim 1, wherein the acquiring the p first frequency bands from the listening frequency band set to form the first frequency band group after receiving the listening frequency band set sent from the base station comprises:
   after receiving the listening frequency band set sent from the base station, acquiring the p first frequency bands with the highest listening priority from the listening frequency band set according to the priority information, so as to form the first frequency band group.

5. The method according to claim 1, wherein the priority information is a preset information; or
   the priority information is sent to the UE by the base station through channel occupation time COT deployed for the UE; or
   the priority information is sent to the UE by the base station through a higher layer signaling or a physical layer signaling.

6. The method according to claim 1, wherein the UE comprises m radio frequency modules, m is a positive integer, each of the radio frequency modules corresponds to a frequency band set, and said radio frequency module is used for listening in to frequency bands in a corresponding frequency band set, wherein the frequency band set comprises at least one frequency band in the listening frequency band set, and the listening priority of the frequency band in the frequency band set is the same as the listening priority of the radio frequency module corresponding to the frequency band set;
   the priority information is obtained according to the listening priorities of the m radio frequency modules.

7. The method according to claim 1, wherein the listening in to a second frequency band group in response to determining that the p first frequency bands are all occupied comprises:
   in response to continuously determining for n times that the p first frequency bands are all occupied, listening in to the second frequency band group, wherein n is a preset number of times of listening in to the first frequency band group, and n is a positive integer.

8. The method according to claim 7, wherein the number of times n of listening in to the first frequency band group is sent to the UE by the base station through a high layer signaling or a physical layer signaling.

9. The method according to claim 1, wherein the listening in to a second frequency band group in response to determining that the p first frequency bands are all occupied comprises:
   in response to determining that the p first frequency bands are all occupied within a target duration, listening in to the second frequency band group.

10. The method according to claim 9, wherein the target duration is sent to the UE by the base station through a high layer signaling or a physical layer signaling.

11. A listening method, comprising:
sending a listening frequency band set to user equipment (UE), wherein the listening frequency band set comprises at least two frequency bands on an unlicensed spectrum required to be listened by the UE;
sending priority information to the UE, wherein the priority information is used for indicating listening priorities of the frequency bands included in the listening frequency band set;
wherein the UE is configured to:
after receiving the listening frequency band set from the base station, acquire a p first frequency bands from the listening frequency band set to form a first frequency band group;
listen in to the first frequency band groups;
in response to determining that the p first frequency bands are all occupied, acquire q second frequency bands, the listening priority of which is lower than that of the p first frequency bands, from the listening frequency band set according to the priority information, so as to form a second frequency band group; and
listen in to the second frequency band group;
wherein the first frequency band group comprises the p first frequency bands, and the second frequency band group comprises the q second frequency bands, p and q are positive integers, the p first frequency bands and the q second frequency bands are in the listening frequency band set.

12. The method according to claim 11, wherein the p first frequency bands and the q second frequency bands are on different component carriers (CC); or
the p first frequency bands and the q second frequency bands are in different bandwidth parts (BWP).

13. The method according to claim 11, wherein the listening frequency band set is sent to the UE by the base station after the UE accesses and operates on the unlicensed spectrum.

14. The method according to claim 11, wherein the priority information is sent to the UE by the base station through channel occupation time COT deployed for the UE; or
the priority information is sent to the UE by the base station through a higher layer signaling or a physical layer signaling.

15. A base station implementing the listening method according to claim 11, comprising:
a processor; and
memory for storing instructions executable by the processor;
wherein the instructions, when executed by the processor, cause the processor to execute steps of the listening method.

16. User equipment (UE), comprising:
a processor; and
memory for storing instructions executable by the processor;
wherein the processor is configured to:
listen in to a first frequency band group, wherein the first frequency band group comprises p first frequency bands, and p is a positive integer;
listen in to a second frequency band group in response to determining that the p first frequency bands are all occupied, wherein the second frequency band group comprises q second frequency bands, and q is a positive integer;
wherein the p first frequency bands and the q second frequency bands are on an unlicensed spectrum, and a listening priority of the p first frequency bands is higher than the listening priority of the q second frequency bands;
wherein the processor is further configured to:
receive a listening frequency band set from a base station, wherein the listening frequency band set comprises at least two frequency bands on the unlicensed spectrum required to be listened by user equipment (UE), and the listening frequency band set comprises the p first frequency bands and the q second frequency bands;
after receiving the listening frequency band set from the base station, acquire the p first frequency bands from the listening frequency band set to form the first frequency band group; and
listen in to the first frequency band group;
wherein the processor is further configured to:
acquire priority information, wherein the priority information is used for indicating listening priorities of frequency bands included in the listening frequency band set;
in response to determining that the p first frequency bands are all occupied, acquire the q second frequency bands, the listening priority of which is lower than that of the p first frequency bands, from the listening frequency band set according to the priority information, so as to form the second frequency band group; and
listen in to the second frequency band group.

17. The UE according to claim 16, wherein the UE operating on the unlicensed spectrum is configured to first listen in to the p first frequency bands with higher priority on the unlicensed spectrum, and then listen in to the q second frequency bands with lower priority only when the UE fails to transmit communication data through the p first frequency bands.

18. A non-transitory computer-readable storage medium storing computer programs, wherein the computer programs, when executed by a processing component, cause the processing component to execute the listening method according to claim 1.

* * * * *